Jan. 4, 1944.  G. E. SHRIVER ET AL  2,338,549
FILTER BAG
Filed Aug. 1, 1941
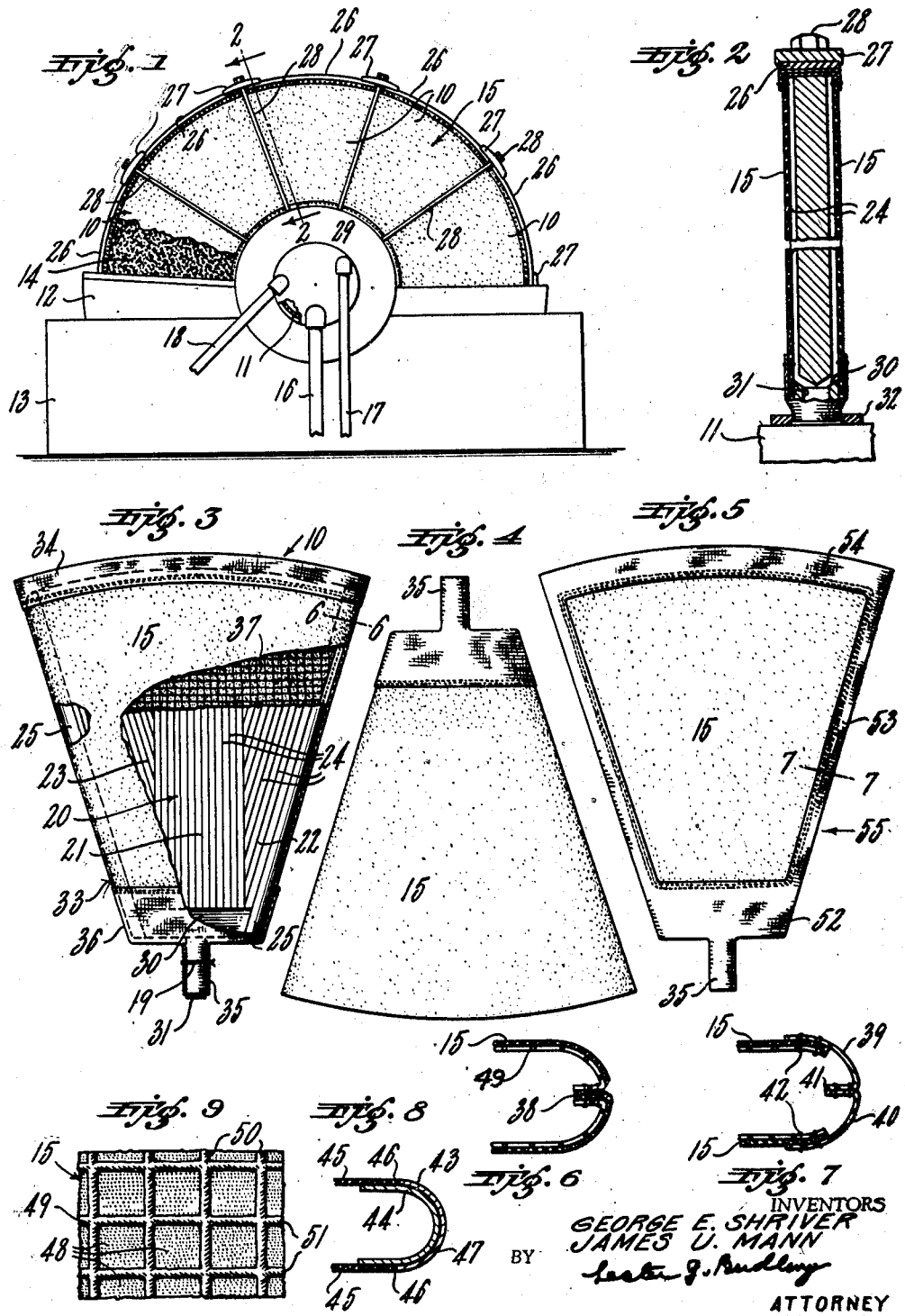
INVENTORS
GEORGE E. SHRIVER
JAMES U. MANN
BY
ATTORNEY Patented Jan. 4, 1944

2,338,549

UNITED STATES PATENT OFFICE 2,338,549

FILTER BAG

George E. Shriver, Nutley, and James U. Mann, Arlington, N. J., assignors to United States Rubber Company, New York, N. Y., a corporation of New Jersey Application August 1, 1941, Serial No. 404,986

5 Claims. (Cl. 210—195)

The present invention relates to leaf filters of both the intermittent and continuous types, especially to improvements in filter bags for such filters, and is of particular utility when embodied in filter bags for use on the continuous type of leaf filter known commercially as the "American" leaf filter, although our invention is available for use in any field of filtration for which it is adapted by the nature of our improvements.

Such American filters are standard equipment for many purposes and the principles of their construction and operation are well-known, so that they need not be herein set forth in detail, but reference may be had to the literature for a full exposition of their structure and characteristics, including such publications as that by Pickard entitled "Filters and Filtration" (Ernest Benn, Ltd., 1929) where the above type of filter is illustrated and described in detail at pages 196 to 203 inclusive.

The conventional filter bags used on such filters are commonly composed of woven textiles of various types, usually cotton or wool. Other textiles, such as rayon, fibrous vinyl acetate, glass fibers, and asbestos, may be used. Recently, filter bags composed completely of a perforate rubber sheet material known commercially as "Multipore" have been employed. The last named material when used is very efficient, but for the entire filter is somewhat more expensive than other materials, and accordingly an object of the present invention is to provide a filter bag suitable for use in continuous rotary leaf filters, which will combine the advantages of the perforate rubber filter bag with the sturdiness and low cost of the all cloth filter bag.

Accordingly the invention consists primarily of a composite filter bag fabricated with filtering areas composed of a perforate rubber sheet material of the above character united to supporting areas composed of a heavy cloth, such as cotton duck or twill.

Other objects and features of the invention will appear as the description of the now preferred structure selected for illustration and description proceeds.

In the accompanying drawing, like characters of reference have been applied to corresponding parts throughout the structure illustrated in the views making up the drawing, in which:

Fig. 1 is an end view of a so-called "disc" section of an American type rotary leaf filter, showing a filter disc consisting of ten filter sectors mounted on a hollow rotatable shaft or axle, said disc being partly immersed in the liquid to be filtered, which is contained in a tank, as shown;

Fig. 2 is a fragmentary detail view in vertical section of the same filter disc, taken separately from the structure illustrated in Fig. 1, and shown on a larger scale;

Fig. 3 is a detail view, in front elevation, on an enlarged scale, showing one of the filter sectors making up the filter disc of Fig. 1, parts being broken away to reveal interior structure;

Fig. 4 is a similar view in front elevation of a modified form of filter bag adapted to be mounted as shown in Fig. 3;

Fig. 5 is a similar view of another modification;

Fig. 6 is a fragmentary detail view in transverse section on the line 6—6 of Fig. 3, showing on a larger scale the structure of a side seam joining perforate filter panels of rubber sheet material;

Fig. 7 is a similar fragmentary detail view in transverse section illustrating one mode of attaching the rubber filtering panel to a co-operating textile reinforcement;

Fig. 8 is a similar view of a modified mode of accomplishing the same attachment; and Fig. 9 is a fragmentary detail view in plan of a portion of the perforate reinforced rubber filter medium, as shown in the preceding figures, taken on a larger scale.

Referring to the drawing, Fig. 1 illustrates a filter disc from an American continuous leaf filter of the type shown and described in the above work by Pickard, and in the instance now illustrated only an end disc appears, with its associated parts, the disc being formed with ten sections 10 mounted on a rotatable hollow shaft or axle 11, each sector being partly submerged as the disc is rotated, dipping the outer ends of the sectors successively in the tank or trough 12 which contains a body (not shown) of the liquid to be filtered, the trough being mounted on a base 13.

As the disc rotates, the sectors entrain successively from the tank, on their opposite faces, and carry upwardly out of the liquid, the wet solids to be filtered, in the form of a cake, as indicated at 14, and the filtrate is extracted from the cake of wet solids through a perforate rubber face panel 15 at each face of each sector, passing into the interior of the sector under the action of suction made effective through a suitable connection, such as the filtrate eduction pipe 16, in the conventional manner described at length by Pickard, and well-known to those skilled in the art of filtration. Cleaning fluid and air may be introduced, as usual, through pipes 17 and 18, respectively, in communication with the interior of the hollow shaft 11.

The cake 14 is broken away, for the sake of clearness in the illustration of the disc structure, and it is to be understood that the cake will be eventually removed for final disposition by any suitable means, of any suitable character known to those skilled in the art of filtration, so that illustration thereof is not necessary, as such means do not form an essential part of the instant invention.

Each of the rotary filtering discs or leaves is built up, as already stated briefly, of ten sectors each designated by the reference character 10, and each of the sector structures comprises a sector-shaped drainage frame, designated generally by the reference character 20 (see Fig. 3), in the fabrication of which the conventional usage may be followed, or these frames may be of any suitable construction. The frame 20, as shown illustratively in Fig. 3, comprises three pieces of wood 21, 22 and 23, each provided on both faces with drainage grooves, as 24, and at its side margins the frame is bound with U-shaped metal side strips 25, at the outer ends of which an arcuate plate or strip 26 (see Figs. 1 and 2), of somewhat flat form, extends along the end of each frame, being held in place on the disc by metal clamps 27, of which each overlaps the ends of two adjacent plates 26, and each is held in turn by a radius bolt 28, running from the central boss 29 of the hollow shaft.

All the corrugations or grooves 24 lead down into a drainage cap 30 (see Fig. 3), provided with a nipple 31 which is in communication with the interior of the hollow shaft 11, as indicated in Fig. 2, a rubber washer 32 serving to seal the joint.

Each filter bag, as a whole, is designated by the reference character 33, as in Fig. 3, and is supplied in correct shape to slip on one of the sector frames, the outer end being open to permit such emplacement before installation of the sector as part of the disc. The curved edges of the bag, as 34, are then folded over each other neatly, and are closed by one of the bag strips 26 when in working position, as shown in Fig. 1 and Fig. 2. The joint at the nipple end may be made tight merely by tying the neck 35 of the bag around the nozzle 31, as indicated in Fig. 3, at 19.

In pursuance of the invention, the filter panels 15 in each of the forms shown are made from perforate sheet material of the type known generally as "Multipore," which forms the subject matter of Letters Patent No. 2,032,942, and these panels embody the reinforced type of that material disclosed and claimed in co-pending application for United States Letters Patent Serial No. 361,542.

In the structure of filter bag shown in Fig. 3, pursuant to the invention, provision is made at both ends of the filter bag, at the non-filtering areas 34 and 36 respectively, of a structure comprising a stout cloth fabric such as cotton duck which is preferably of a sturdy twill weave not intended to serve as a filtering medium.

The filter bag may be formed in two portions, as 15, united together along their contiguous side lines either by cementing, or by stitching, the latter mode being indicated in Fig. 6 at 38. This figure shows the manner of connecting the panels 15 of perforate rubber material in the bag structure also as shown in Fig. 4, which differs from that of Fig. 3 only in not having the edges 34 reinforced by fabric.

Figs. 7 and 8 show alternate modes of attaching the rubber filtering panels 15 to the co-operating textile reinforcements. In Fig. 7, the textile reinforcements 39 and 40 are lapped over and united to the perforate rubber filtering panels 15, either by stitching as indicated at 42, or by cementing (not shown). The reference character 41 indicates a known form of seam joining the parts 39 and 40.

Fig. 8 shows another method of attaching perforate rubber panels 45 to the cloth reinforcement. In this construction, two layers of textile are used; one layer, 44, being lapped under the perforate rubber panel 45 and the other layer 43 being abutted against an edge of each perforate panel 45.

The inner fabric layer 44 may be attached to the perforate rubber panels 45 by cementing, as indicated at 47, or by stitching (as at 42 in Fig. 7), and the two fabric layers 43 and 44 may be similarly united to each other. If desired, the small crevices between the perforate rubber panel and the upper fabric layer may be filled with an adhesive compound 46 such as a vulcanizable rubber composition at the abutment.

It will be clear from the foregoing disclosure that inasmuch as the perforate rubber 15 (or 45 as the case may be) is only supplied at points where filtering is to be accomplished, the cost of its construction is small relatively, and still all of the advantages secured by a perforate rubber fabric of this character may be obtained in use.

At the same time, by making use of a sturdy low-cost fabric such as duck or twill, to form the non-filtering areas herein described, it will be clear that all the advantages of such a sturdy, low-cost construction are preserved, and therefore, the filter bag as a whole, fabricated thus with perforate rubber filtering portions, and fabric non-filtering portions, will accomplish the objects stated in the opening paragraphs of this specification.

It will also be understood that while the best constructions known to the applicants have been illustrated and described, nevertheless applicants contemplate as within the scope of their appended claims any changes of construction which may be thought desirable by those skilled in the art, in carrying the invention into effect.

One such modification is shown in Fig. 5, in which the non-filtering construction made of fabric is carried along the side margins of the filter bag, as at 53, as well as at the ends 52 and 54, thus adding a certain amount of strength at regions where filtering is not of importance, and with a further advantage in economy of the rubber filtering material 15, which is completely surrounded by the fabric.

The filter medium preferably employed in the filtering panels 15, comprises, as shown on a larger scale in Fig. 9, a sheet of perforate elastic material 15 secured to an open mesh backing 49, the perforations 48 in said elastic material being of sufficiently small dimensions (say 1000 to 10,000 per square inch) to retain a filter cake on the surface of said medium, the backing fabric 49 being so adhered to the perforate rubber 15 that, when fluid is impelled therethrough out of the sector frames, as by washing-fluid forced through pipe 17 or air blown from pipe 18, the rubber 15 stretches only in localized portions, but not as a complete sheet, said localized portions being defined by the open mesh regions between the warp 50 and weft 51 of the fabric 49 which is applied with said woven material disposed inwardly against the grooved faces 24 of the sector frames.

Having thus described our invention, what we claim and desire to protect by Letters Patent is:

1. As a new article of manufacture, a flat sided sector-shaped composite filter bag comprising a pair of filtering panels each composed of a perforate, resilient and extensible rubber sheet material, forming opposite faces of said bag, radially disposed members of inextensible textile fabric secured to and between the edges of said panels to form a complete bag, and means providing an outlet for the bag.

2. A flat sided filter element adapted to form filter cake on the outside thereof and to have said cake removed by forcing fluid under pressure from the inside to the outside thereof, comprising in combination a pair of filtering panels of porous, resilient and extensible sheet rubber composition and inextensible textile fabric secured to and between the edges of said panels to form a bag and means providing an outlet for the bag.

3. A flat sided filter element adapted to form filter cake on the outside thereof and to have said cake removed by forcing fluid under pressure from the inside to the outside thereof, comprising in combination a pair of substantially sector-shaped panels of porous, resilient and extensible sheet rubber composition and inextensible textile fabric secured to and between the edges of said panels to form a bag and means providing an outlet for the bag.

4. A flat sided filter element adapted to form filter cake on the outside thereof and to have said cake removed by forcing fluid under pressure from the inside to the outside thereof comprising in combination a pair of substantially sector-shaped filtering panels of porous, resilient and extensible sheet rubber composition and inextensible textile fabric members connected to and between the radial edges of said panels to form a bag and means providing an outlet for the bag.

5. A flat sided filter element adapted to form filter cake on the outside thereof and to have said cake removed by forcing fluid under pressure from the inside to the outside thereof comprising in combination a pair of filtering panels each panel being composed of porous, resilient and extensible sheet rubber composition, a coarse open mesh inextensible textile fabric secured to the porous sheet and inextensible members of textile material secured to and between the edges of said panels to form a bag, said inextensible open mesh textile material being adapted to confine the stretching of the rubber sheet to local areas and to prevent the stretching of the sheet as a whole when cake is being removed and means providing an outlet for the bag.

GEORGE E. SHRIVER.
JAMES U. MANN.